United States Patent
Steindl

(10) Patent No.: US 6,892,247 B2
(45) Date of Patent: May 10, 2005

(54) METHOD AND SYSTEM FOR ACTIVE PUBLISHING USING A SLAVE ASSIGNED TO A MASTER SYSTEM TO DETECT, EVALUATE AND MAKE THE MESSAGE AVAILABLE TO AN APPLICATION ASSOCIATED WITH THE SLAVE

(75) Inventor: Guenter Steindl, Poppenricht (DE)

(73) Assignee: Siemens Aktiengesellschaft, Munich (DE)

( * ) Notice: Subject to any disclaimer, the term of this patent is extended or adjusted under 35 U.S.C. 154(b) by 744 days.

(21) Appl. No.: 09/776,715

(22) Filed: Feb. 6, 2001

(65) Prior Publication Data

US 2003/0061293 A1 Mar. 27, 2003

Related U.S. Application Data

(63) Continuation of application No. PCT/EP99/05299, filed on Jul. 23, 1999.

(30) Foreign Application Priority Data

Aug. 6, 1998 (EP) .............................. 98114799

(51) Int. Cl.$^7$ ........................ G06F 15/16; G06F 15/173
(52) U.S. Cl. ....................... 709/253; 709/238; 709/243; 709/250
(58) Field of Search ................................ 704/250, 253, 704/230–232, 238, 243

(56) References Cited

U.S. PATENT DOCUMENTS

| | | | | |
|---|---|---|---|---|
| 4,418,386 A | * | 11/1983 | Vrielink | 713/501 |
| 5,351,243 A | * | 9/1994 | Kalkunte et al. | 370/475 |
| 5,509,006 A | * | 4/1996 | Wilford et al. | 370/401 |
| 5,509,123 A | * | 4/1996 | Dobbins et al. | 709/243 |
| 5,564,025 A | * | 10/1996 | De Freese et al. | 710/110 |
| 5,592,611 A | * | 1/1997 | Midgely et al. | 714/4 |
| 5,864,677 A | * | 1/1999 | Van Loo | 709/232 |
| 6,360,277 B1 | * | 3/2002 | Ruckley et al. | 709/250 |
| 6,687,551 B2 | * | 2/2004 | Steindl | 700/1 |

OTHER PUBLICATIONS

Stevens, W. Richard; TCP/IP Illustrated; 1994; Addison Wesley; Voume 1: The Protocols; pp. 34–37, 169–178.*
Klehmet , U. et al.: Leistungsbewertung der Feldbus–Protokolle Profibus und FIP (Teil 1), ATP Automatisierungstechnische Praxis, vol. 35, No. 6, (Jun. 1993), pp. 355–360.
Volz, M.: "Profibus–DP—der schnelle Bruder", Elektronik vol. 42., No. 26 (Dec. 1993), pp. 50–53 and 58–60.

* cited by examiner

Primary Examiner—Rupal Dharia
Assistant Examiner—Quang N. Nguyen
(74) Attorney, Agent, or Firm—Sughrue Mion, PLLC

(57) ABSTRACT

A communication method for use with a decentralized bus system B, to which a plurality of communication participants are connected, including a first master M1, which is assigned to a first master system MS1, and a second master M2 and a slave S3, which are assigned to a second master system MS2 that is associated with at least one application and provided with a filter table FT containing data entries. A message M having a header (provided with data entries corresponding to the filter table data entries) and message data is formed and transmitted from the first master M1 over the bus B. The message M is detected, and at least some header data are evaluated in the second master system MS2, including being compared to the filter table data entries. The message data D are made available to the application when the header and filter table data entries coincide.

12 Claims, 2 Drawing Sheets

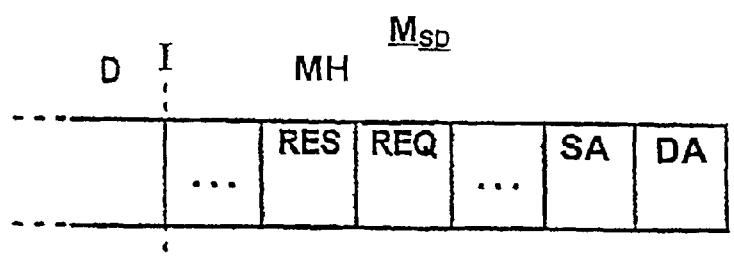 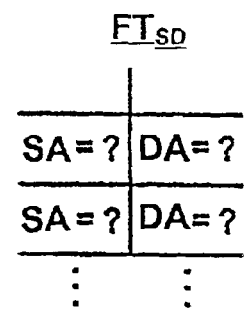
FIG 3A FIG 3B
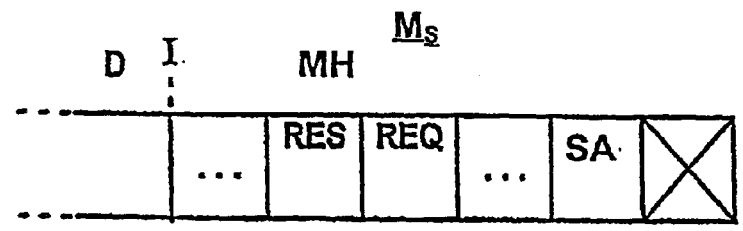 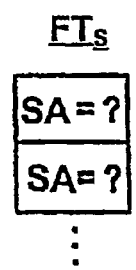
FIG 4A FIG 4B

METHOD AND SYSTEM FOR ACTIVE PUBLISHING USING A SLAVE ASSIGNED TO A MASTER SYSTEM TO DETECT, EVALUATE AND MAKE THE MESSAGE AVAILABLE TO AN APPLICATION ASSOCIATED WITH THE SLAVE

This is a Continuation of International Application PCT/EP99/05299, with an international filing date of Jul. 23, 1999, which was published under PCT Article 21(2) in German, and the disclosure of which is incorporated into this application by reference.

FIELD OF AND BACKGROUND OF THE INVENTION

The invention relates to a communication or data exchange method for use in connection with a decentralized bus system, in particular a field bus, which can be employed in the automation of technical processes. A plurality of communication participants are connected to the bus system, including at least two active communication participants ("masters") and at least one passive communication station ("slave").

An active communication participant is a communication participant in a bus system which can autonomously initiate a communications operation. In contrast, a passive communication participant always requires an external stimulus, in order to place data on the bus. One example of such an external stimulus is a send request from a master.

Each master is assigned to a different master system. The master systems, per se, have no physical manifestation. Rather, the term "master system" is used to describe a configured relationship between an active communication participant and the passive communication participant(s) assigned to it. Namely, the master systems determine the possibility or impossibility of certain communication relationships between the communication participants connected to the bus system. Under the communication relationships defined by the master systems, every message (including a data part and a header part) transmitted over the bus is detected, at least by the slave, which evaluates at least certain data of the message header. When the message header data matches entries stored in a filter table, the slave makes the data of the message available to its application.

The so-called cross-terminal traffic communication or data exchange method improves communication between the participants connected to the field bus. According to the cross-terminal traffic method, data can be exchanged, for example, directly between passive communication stations, (or "slaves"), despite the fact that the communication protocol defined for the field bus, on its face, permits no direct communication relationship between such passive communication members. Prior to development of the cross-terminal traffic method, communication between two passive communication stations had always required an intermediary, in the form of an active communication party (or "master"), and proceeded as follows. A first communication relationship is established between a first passive communication party and a master, and the data is transferred from the first slave to the master. Next, the master establishes a communication relationship with a second passive communication party, and the data is transferred from the master to the second passive communication party, the desired recipient.

OBJECTS OF THE INVENTION

According to one object of the present invention, it is sought to optimize communication in a field bus system and between the communication participants connected to the field bus system, while utilizing the possibilities of cross-terminal traffic.

SUMMARY OF THE INVENTION

According to one formulation, the present invention provides a communication method for use with a decentralized bus system. A plurality of communication participants are connected to the bus system. The communication participants include a first master, which is assigned to a first master system, and a second master and a slave, which are assigned to a second master system. The second master system is associated with at least one application and is provided with a filter table containing data entries.

A message is formed having a header and message data, including providing data entries in the header which correspond to data entries in the filter table. The message is transmitted from the first master over the bus system. The message is detected in the second master system. At least some of the header data are evaluated in the second master system, including comparing the header data with the filter table data entries. The message data are made available to the application when the header data match the filter table data entries.

In a preferred formulation of the communication method, the application is associated with the slave, and the filter table is provided for the slave. In this embodiment, the slave performs the detecting, evaluating, and making steps.

According to a second preferred formulation, which is similar to the first preferred formulation, the message sent by the first master is indistinguishable to the slave, as regards the message header, from a message sent by a communication participant within the second master system, in the context of cross-terminal traffic.

A third preferred formulation of the communication method, which is similar to the second preferred formulation, further includes identifying the message sent by the first master as a "response" using an internal code, so that the message appears to the slave as a cross-terminal traffic message that could have been triggered by a stimulus of the second master.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

FIGS. 3a and 3b illustrate a first message structure and a layout of a corresponding filter table, in the context of cross-terminal traffic; and FIGS. 4a and 4b illustrate a second message structure and a layout of a corresponding filter table, in the context of cross-terminal traffic.

DETAILED DESCRIPTION OF THE PREFERRED EMBODIMENTS

Figure 1:
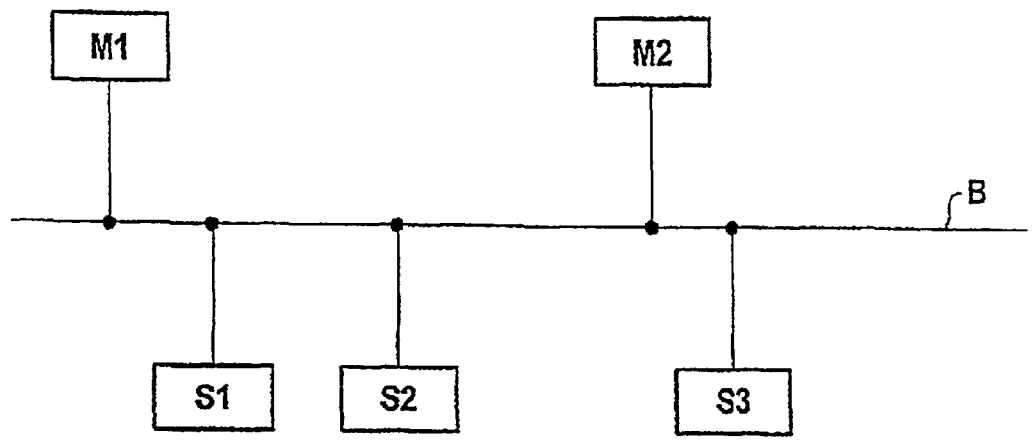
FIG. 1 shows a simple bus topology.

FIG. 1 shows an illustrative bus topology having a bus system B and communication participants connected to the bus system B. For illustrative purposes, FIG. 1 shows two masters M1, M2 and three slaves S1, S2, S3 as examples of communication participants. The bus topology is in no way limited to the masters and slaves shown in FIG. 1.

The advantages and capabilities of the cross-terminal traffic method discussed above are described in European Patent Application 97102093.8, which was filed on Feb. 10, 1997. Using the cross-terminal traffic method, a communication relationship can be established such that a send request is sent by an active communication participant, e.g. the master M1, to at least one of the slaves, e.g. S1. The slave S1 reacts by placing the requested data on the bus B in the form of a message. According to this method, the data placed on the bus include a code, for example in the message header, which identifies the slave S1 as the sender, and a further code which identifies the master M1, for example, as the recipient. The other communication participants connected to the bus system, in particular the slaves S2, S3, register the message from the slave S1 to the master M1, while listening to the traffic on the bus B.

In order to be able to participate in cross-terminal traffic, the communication participants are provided with a filter table which stores the information as to which messages traveling over the bus the cross-terminal traffic party should register, including messages that are not directly addressed to that participant's destination address. If, therefore, an entry is stored for the slave S3 in its filter table in the form "sender: S1, recipient: M1", the slave S3 accepts messages with this code and makes them available to its applications. In this manner, the cross terminal traffic method dispenses with the path via an intermediary master M1. Namely, the data that arrived directly at the slave S3 by means of cross-terminal traffic would otherwise have had to have been transmitted from the slave S1 to the master M1, and from the latter to the slave S3.

In an alternative form of cross-terminal traffic, a send request is sent by the master, e.g., M1, to at least one of the slaves, e.g., S1. Upon receipt of the send request, the slave S1 reacts by placing the requested data on the bus, with an origin code that identifies the slave S1 as the sender and with a destination code that causes the telegram to be directed to all participating communication members. Sending data in this way is also referred to as "publishing," and, hereafter, placement by a sender, of a message directed "to all," on the bus will be referred to as publishing.

All communication participants that receive the message published by the slave S1 evaluate the received data on the basis of a filter table, which is configured specifically for each respective communication participant, and, when appropriate, make the data available to their respective application. The filter table used for this alternative form of cross-terminal traffic essentially corresponds to the filter table described above, except that instead of clearly directed transmissions, e.g. starting from the slave S1 and directed to the master M1, being monitored, published transmissions are monitored. Published transmissions are identifiable as publishing on the basis of the code "to all" and additionally on the basis of the origin code.

Because the destination code is the same for each publishing, theoretically the filter table for the alternate form of cross-terminal traffic can be reduced to the origin code. However, in practice the service access point (SAP) may likely also be included in the filtering. Formulated in textual terms, a filter table of this type allows each passive communication party to receive and evaluate, respectively, the publishings of specific other slaves. For the example above, it could be specified that the publishings of slaves S1 and S2 are received and evaluated by the slave S3, that the publishings of S1 and S3 are received and evaluated by S2, and that the publishings of S2 and S3 are received and evaluated by S1.

Figure 2:
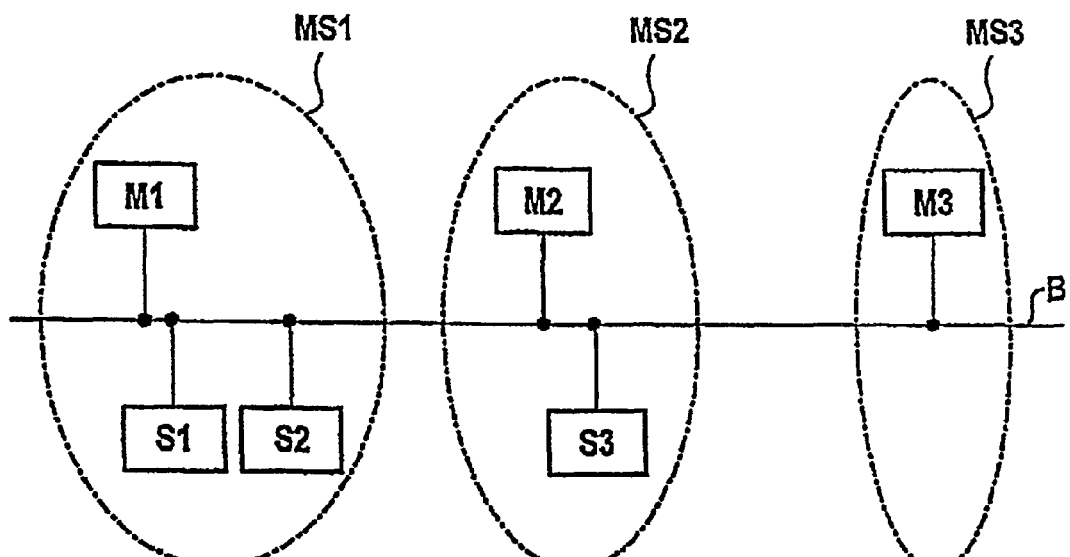
FIG. 2 shows an identification of three master systems established on the bus.

As noted above, the relationship between the active communication participants and the passive communication participants assigned to them is referred to as a master system. FIG. 2 shows three master systems MS1, MS2, MS3 established on the bus system B, with the master system MS1 comprising a master M1 and slaves S1 and S2. Analogously, the master system MS2 comprises communication participants M2, S3, and the master system MS3 comprises communication participant M3.

The fundamental underlying standard EN 50170 Part II does not provide for communication relationships between participants of a first and a second master system, e.g. between MS1 and MS2. One reason is that, due to the configuration of the, e.g., first master system MS1, the transport addresses of the members of the master system MS2 are not known and consequently cannot be used in a communications operation initiated by a member of the first master system MS1. In addition, the communication relationship between a master of a master system and the slaves assigned to it is configured such that a recipient of a message from a remote master system detects that this message does not belong to the communication relationship configured for the remote master system. As a result, the received message is rejected and thus is not registered and evaluated.

Cross-terminal traffic, however, permits a communication relationship between slaves of different master systems, wherein, for example, the master M1 of the first master system MS1 sends a request, i.e. a send request, to the slave S2 assigned to the first master system MS1. The slave S2 then publishes its data. Consequently, all of the communication participants connected to the bus system, including those of the second master system MS2 for example, can listen in on these data on the bus.

A passive communication participant, such as the slave S3, listens in on this publishing from the slave S2, like all of the other communication participants. The slave S3 evaluates the data and determines, based on a filter table configured for the slave S3, whether it should make the received data available to its application. To this extent, communication between different master systems is possible via cross-terminal traffic. Furthermore, communication between communication participants of the same master system which normally cannot communicate directly with one other, namely between two passive communication participants of the same master system for example, can also occur via cross-terminal traffic.

However, this method does not provide for communication between a master of a first master system and a communication participant of a second master system. As explained above, a direct communication relationship between, for example, the master M3 of the master system MS3 and the slave S2 of the master system MS1 fails because a recipient of a message from a remote master system detects that this message does not belong to the communication relationships configured for its own master system MS1 and therefore rejects the message.

The present invention provides a method for communication between an active communication participant of one master system and a communication participant of another master system. In order for, e.g., the master M3 of the master system MS3 to be able to communicate with a communication party of the master system MS1, e.g. the slave S1, the master M3 converts the data into a special format for sending on the bus. In particular, the header of the message issued, the so-called message header, contains entries that can pass through the filter table of the passive communication party S1. In other words, the message header entries are selected to satisfy the filter criteria of the filter table, which would otherwise block the message if the filter criteria were not met. The message sent by the master M3, therefore, appears to the recipient S1, at least with respect to the header, as if it had been sent by another communication participant within the first master system, either active or passive, in the context of cross-terminal traffic.

By virtue of the present invention, therefore, the closed structure of the individual master systems is opened to the transmission of messages from communication parties of one master system to communication parties of another master system.

According to one aspect of the present invention, open transmission of messages between communication participants of different master systems is accomplished such that, when, for example, the master M3 wishes to output data to the slave S2, a message is generated for this purpose. The message is characterized by entry of "to all" as the destination address and the entry of the sender's address (i.e. in this case, the address of the master M3) as the source address. As a result, the slave S2 detects the message received from the master M3 as a message with a structure that it would accept in the context of cross-terminal traffic.

Alternatively, the communication participant S2 can be configured to accept a message issued by the master M3 as valid for cross-terminal traffic, only when an internal code identifies the message as a "response." With this arrangement, the message issued by the master M3 of the master system MS3 for the slave S2 of the master system MS1 represents a message in the context of cross-terminal traffic which may have been triggered by a stimulus, for example, of its own master M1.

The entries in the message header MH and the corresponding data of the filter table FT are shown for two message structures, in FIGS. 3a, 3b and FIGS. 4a, 4b, respectively. According to FIG. 3a, a first message $M_{SD}$ includes a data part D and a header part MH. The message header MH includes positions for entering the source address SA and the destination address DA. The destination address DA identifies the recipient of the message, while the source address SA identifies the sender of the message. In addition, positions are provided which identify the telegram as a send request (request REQ) or as a reply to the send request, namely a response RES. With respect to the identification as a request REQ or response RES, two separate entries can be provided in the message header, as illustrated in FIGS. 3a and 4a. With this configuration, entry of a "logic one" at the request position identifies the message as a request, while accordingly the response position would contain a "zero." Alternatively, the message header MH can be configured to include only one position, as is illustrated in the message structure of FIG. 4a, in which a first entry identifies the telegram as a request and a different, second entry identifies the telegram as a response.

FIG. 3b shows a filter table $FT_{SD}$, for the first message structure $M_{SD}$ of FIG. 3a, in which associated source and destination addresses SA, DA can be entered. The source and destination address entries of every message received are compared with the corresponding entries of the filter table. If a match is determined, the communication participant makes the message available to its applications.

The message $M_S$ depicted in FIG. 4a differs from the message $M_{SD}$ of FIG. 3a, in that no explicit destination address is specified in the former. Without an explicit destination address, the message is directed quasi "to all." As the destination address information is not included in the message $M_S$, the filter table $FT_S$ can be accordingly reduced to the source address data, as shown in FIG. 4b. It should however be noted that, if the tables according to FIG. 3b and/or FIG. 4b are reduced to one data entry relating to the station number, that this information constitutes a minimum. One embodiment, therefore, provides a filter table that includes, in each case, not only information relating to the station number (for filtering received data with respect to the source address) but also information relating to the source service access points (SAPs) (for filtering the received data with respect to the SAP used when the incoming data were sent out).

As discussed above, relationships can be configured such that a message can be accepted as valid, in the context of cross-terminal traffic, only when an internal code identifies the message as a response. The internal code can be encoded in the message header using either of the message header structures illustrated in FIGS. 3a and 4a, as discussed above. For this configuration, no filter table is required to check this code. Namely, this simple if-then decision obviates use of a filter table containing source and address information, with the message being accepted if the response code is detected, and the message being rejected otherwise.

Consequently, the communication method of the present invention enables active communication participants of remote master systems to send data to communication participants of a master system that would otherwise not be contactable per se. As a prerequisite, the communication participants are provided with a filter table of the type described above. The recipient communication participants compare at least the message header with the data entered in the filter table for their respective configuration. When these match, the recipient communication participants evaluate the data accordingly and make them available to the respective applications.

The novel communication method of the present invention can be advantageously employed, for example, for use with applications for which it is necessary to influence either all or a group of system components simultaneously or nearly simultaneously. One example of such an application is the triggering of an emergency stop function at an operator terminal.

With reference to FIG. 2, for example, the emergency stop function would be monitored by the master M3. As soon as the emergency stop is triggered, the master M3 sends a message according to the present invention to the communication participants of the other master systems. Advantageous applications of the communication method of the present invention are, of course, not limited to the handling of an emergency stop. Rather, the present invention can also be used advantageously, for example, to trigger a "synchronous stop" or similar actions that require a certain synchronicity, or where rapid communication to all communication participants connected to the bus system is required.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A communication method for use with a decentralized bus system to which a plurality of communication participants are connected, including a first master, which is assigned to a first master system, and a second master and a slave, which are assigned to a second master system, the second master system being associated with at least one application and being provided with a filter table containing data entries, said method comprising:

forming a message having a header and message data, including providing data entries in the header which correspond to data entries in the filter table;

transmitting the message from the first master over the bus system;

detecting the message in the second master system;

evaluating at least some of the header data, in the second master system, including comparing the header data entries with the data entries of the filter table; and making the message data available to the application, when the header data entries match the data entries of the filter table, wherein the application is associated with the slave and the filter table is provided for the slave, and wherein said detecting, evaluating, and making steps are performed by the slave.

2. A communication method according to claim 1, wherein said forming step includes providing message header data entries for publishing the message.

3. A communication method according to claim 1, wherein said forming step includes encoding the message header to specify a source address but no destination address.

4. A communication method according to claim 1, wherein the message sent by the first master is indistinguishable to the slave, as regards the message header, from a message sent by a communication participant within the second master system, in the context of cross-terminal traffic.

5. A communication method for use with a decentralized bus system to which a plurality of communication participants are connected, including a first master, which is assigned to a first master system, and a second master arid a slave, which are assigned to a second master system, the slave being associated with at least one application, said method comprising:

forming a message having a header and message data, including providing data entriees in the header which identify the message as a response using an internal code and which render the message header indistinguishable from a message sent by a communication participate within the second master system, in the context of cross-terminal traffic;

transmitting the message from the first master over the bus system; detecting the message by the slave;

evaluating at least some of the header data by the slave; and making the message data available to the application, when, during said evaluating step, the data entries identifying the message as a response using an internal code make the message appear to the slave as a cross-terminal traffic message that could have been triggered by a stimulus of the second master.

6. A communication system comprising:

a decentralized bus system;

a first active communication participant, which is connected to said bus system and assigned to a first master system, said first active communication participant is configured to form a message comprising a header and message data and to transmit said message over said bus system;

a second active communication participant, which is connected to said bus system and assigned to a second master system;

a passive communication participant, which is connected to said bus system, assigned to said second master system, and configured to detect said message;

at least one application associated with said passive communication participant; and a filter table containing data entries that is provided for said passive communication participant, wherein said header of said message formed by said first active communication participant comprises data entries which correspond to data entries of said filter table, and wherein said passive communication participant evaluates at least some of said header data, including comparing said header data with said filter table data entries, and makes said message data available to said application, when said header data match said filter data entries.

7. A communication system according to claim 6, wherein said message header data comprises:

a destination address; and a source address.

8. A communication system according to claim 7, wherein said filter table data entries comprise;

source address information; and destination address information.

9. A communication system according to claim 7, wherein said destination address and said source address are configured to publish said message.

10. A communication system according to claim 6, wherein said message header data comprises a source address but no destination address.

11. A communication system according to claim 10, wherein said filter data entries comprise source address information but no destination address information.

12. A communication system according to claim 10, wherein said filter table data entries comprise:

source address information; and source service access point information for filtering with respect to a service access point used when said message was sent.

* * * * *